United States Patent
Ichikawa

(10) Patent No.: US 6,752,252 B2
(45) Date of Patent: Jun. 22, 2004

(54) MULTIPLATE CLUTCH

(75) Inventor: Kiyokazu Ichikawa, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 17 days.

(21) Appl. No.: 10/223,957

(22) Filed: Aug. 21, 2002

(65) Prior Publication Data

US 2003/0038013 A1 Feb. 27, 2003

(30) Foreign Application Priority Data

Aug. 22, 2001 (JP) ........................................ 2001-251623

(51) Int. Cl.$^7$ ............................................. F16D 25/06
(52) U.S. Cl. .............................. 192/85 AA; 192/85 CA; 192/112
(58) Field of Search .......................... 192/85 AA, 112, 192/70.2, 85 CA; 403/274, 282

(56) References Cited

U.S. PATENT DOCUMENTS

| | | | | |
|---|---|---|---|---|
| 4,094,393 A | * | 6/1978 | Spokas | ..................... 192/82 T |
| 4,869,355 A | * | 9/1989 | Corral et al. | ................. 192/98 |
| 5,547,058 A | * | 8/1996 | Parzefall et al. | ........ 192/85 CA |
| 5,701,976 A | * | 12/1997 | Kumagai et al. | .......... 188/71.5 |
| 5,810,145 A | * | 9/1998 | Thomire | ................ 192/85 CA |
| 5,865,288 A | * | 2/1999 | Thomire et al. | ........ 192/85 CA |

* cited by examiner

Primary Examiner—Saul Rodriquez
(74) Attorney, Agent, or Firm—Crowell & Moring LLP

(57) ABSTRACT

A multiplate clutch is provided with a clutch case and a sleeve fitted in an inner circumferential wall of the clutch case with their piston oilways registered with each other. The sleeve is provided in an outer circumference thereof with at least one notch. The inner circumferential wall of the clutch case has been crimped at a portion thereof into each notch such that a crimped portion is formed to fixedly secure the sleeve on the inner circumferential wall of the clutch case. Preferably, the crimped portion can be formed such that a front surface of the crimped portion is shallower on a side of the sleeve and deeper on a side of the clutch case. The front surface may desirably have an inclination of from 5 to 15°. Desirably, the sleeve can be provided with two or more notches.

3 Claims, 4 Drawing Sheets

MULTIPLATE CLUTCH

BACKGROUND OF THE INVENTION a) Field of the Invention

This invention relates to a multiplate clutch, and especially to an attachment structure of a sleeve on a clutch case.

b) Description of the Related Art

FIG. 1 illustrates in a cross-section one example of a basic construction of a multiplate clutch 10. Designated at numeral 1 are separator plates, each of which is not provided with friction linings and is in engagement with a spline 31 on a clutch case 3. Numeral 2 indicates friction plates, each of which carries on both sides thereof friction linings bonded thereon. Numeral 4 designates a piston arranged for actuation by hydraulic pressure and upon engaging the clutch, the piston 4 presses the separator plates 1 and the friction plates 2 against a stopper ring 5. There are also shown a return spring 6 for causing the piston 4 to return upon disengaging the clutch, a canceller seat 7, a stopper ring 8 for the canceller seat 7, a bearing 9 for a shaft 40, a central axis 50 of the shaft 40, a left oilway 35 formed for the piston 4 through an inner circumferential wall of the clutch case 3, and an oilway 41 also formed for the piston 4 through the shaft 40.

A clutch case is made of aluminum to reduce its weight. As is appreciated from the drawing, however, the clutch case 3 is kept around its piston oilway 35 in sliding contact with sealing members 42 arranged on the shaft 40. It is, therefore, necessary to surely provide the clutch case 3 with abrasion resistance. A sleeve 20 of a non-aluminum metal is, hence, press fitted in and fixed on the inner circumferential wall of the clutch case 3.

However, the non-aluminum metal and aluminum are different in the coefficient of linear thermal expansion. In an actual use environment, the temperature varies. As a consequence, individual parts of the clutch undergo expansion. The aluminum clutch case and the non-aluminum sleeve are different in the degree of expansion, so that the sleeve may become loose relative to the clutch case although the sleeve was press fitted. As a result, the sleeve may slide relative to the clutch case and an oilway 21 of the sleeve 20 and the oilway 35 of the clutch case 3 may become out of registration, leading to occurrence of a problem that pressure oil would no longer be supplied for the actuation of the piston.

SUMMARY OF THE INVENTION

It is, therefore, necessary to fix the clutch case and the sleeve with each other such that despite a difference in expansion between them upon occurrence of a temperature variation, the sleeve does not slide relative to the clutch case to avoid occurrence of any positional non-registration between their oilways.

In one aspect of the present invention, there is thus provided a multiplate clutch provided with a clutch case and a sleeve fitted in an inner circumferential wall of the clutch case with their piston oilways registered with each other, wherein:

the sleeve is provided in an outer circumference thereof with at least one notch; and the inner circumferential wall of the clutch case has been crimped at a portion thereof into the notch such that a crimped portion is formed to fixedly secure the sleeve on the inner circumferential wall of the clutch case.

As the multiplate clutch according to the present invention is constructed as described above, the clutch case and the sleeve are fixed together by crimping. Even when a difference arises in expansion between the clutch case and the sleeve due to a difference in material therebetween at an elevated temperature, their engagement does not become loose so that no sliding takes place between them. It is, therefore, possible to prevent their oilways, which are arranged to supply pressure oil to actuate a piston, from becoming out of registration.

DETAILED DESCRIPTION OF THE INVENTION AND PREFERRED EMBODIMENT

Figure 1:
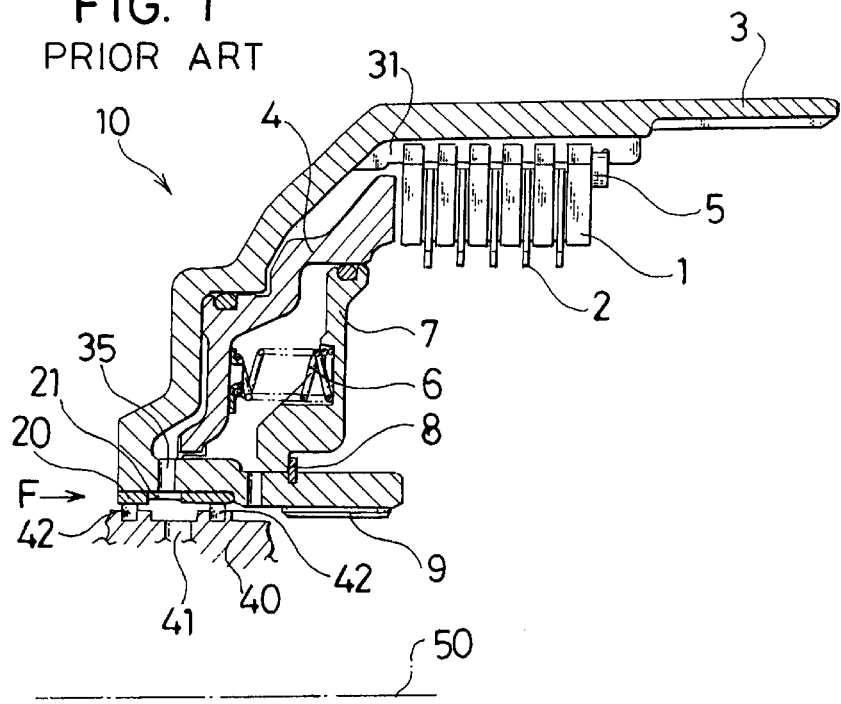
FIG. 1 is a fragmentary cross-sectional view showing one example of a basic construction of a multiplate clutch.
Figure 2:
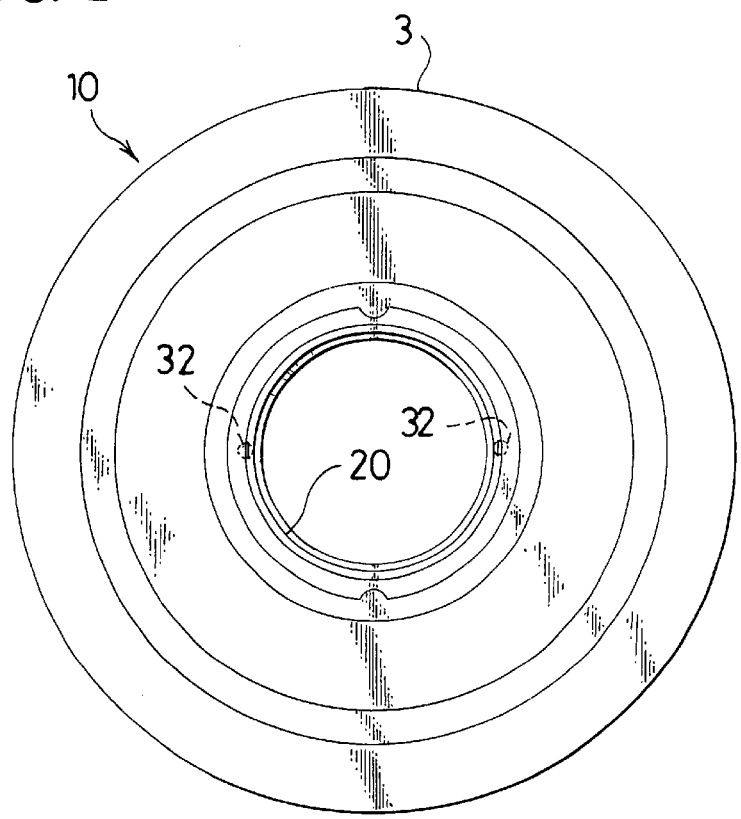
FIG. 2 is a front view illustrating a positional relation between a clutch case and a sleeve in a multiplate clutch according to one embodiment of the present invention.
Figure 3:
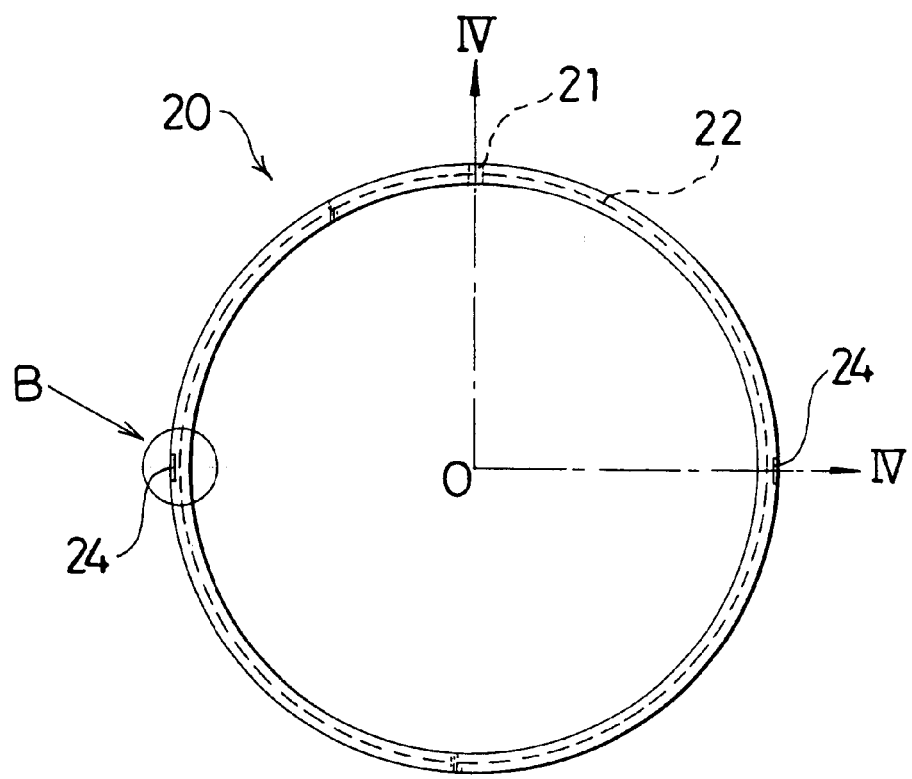
FIG. 3 is a front view of the sleeve.
Figure 4:
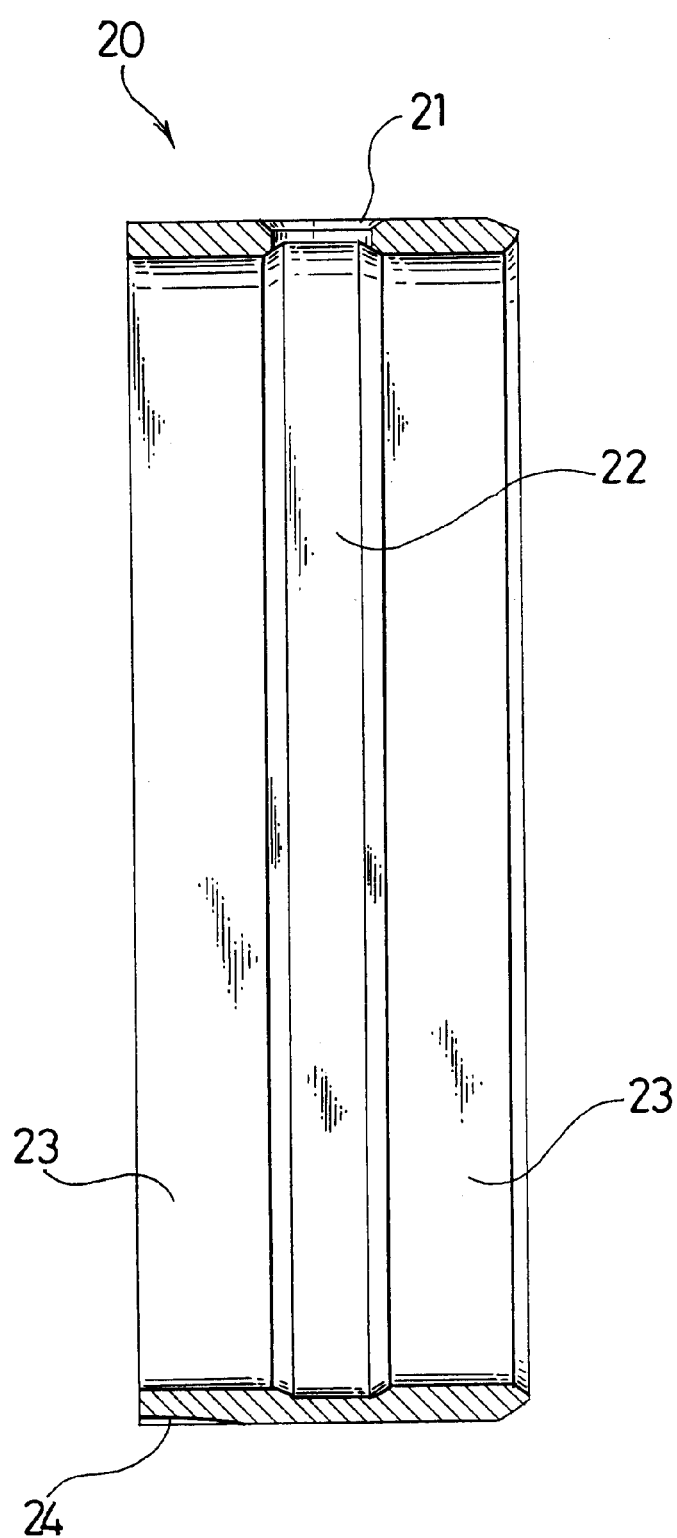
FIG. 4 is a cross-sectional view of the sleeve, taken in the direction of arrows IV-O-IV of FIG. 3.
Figure 5:
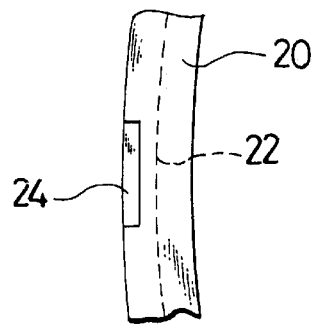
FIG. 5 is an enlarged view of a portion of the sleeve, which is indicated by a circle B in FIG. 3.

With reference to FIGS. 2 through 5, a description will firstly be made of the multiplate clutch according to the one embodiment of the present invention. In these drawings, there are shown an oilway 21, a pressure-oil communicating groove 22, bearing tracks 23 for associated sealing members 42, and notches 24 into which a clutch case 3 is to be crimped as will be described in detail subsequently herein. These oilway 21, pressure-oil communicating groove 22, bearing tracks 23 and notches 24 are all formed on a sleeve 20. Designated at numeral 32 are portions of an inner circumferential wall of the clutch case 3, which are located corresponding to the notches 24 and are to be crimped into the notches 24, respectively. These portions 32 may hereinafter be referred to as "the to-be-crimped portions 32" for the convenience of description.

Figure 6:
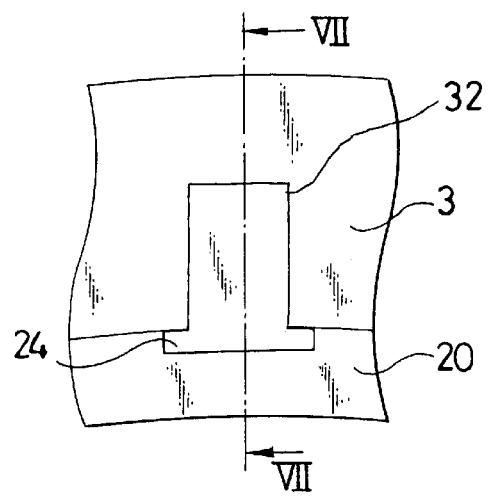
FIG. 6 is an enlarged fragmentary front view of the clutch case and sleeve, and illustrates a portion of the clutch case, which is to be crimped, in detail together with a corresponding notch formed in the sleeve.
Figure 7:
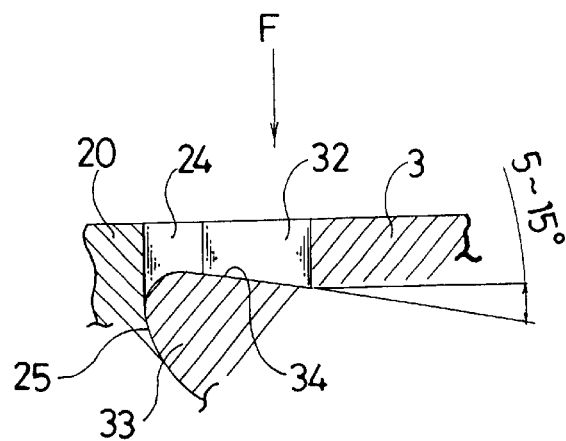
FIG. 7 is a fragmentary cross-sectional view of the clutch case and sleeve after crimping, taken in the direction of VII—VII of FIG. 6.

Referring next to FIGS. 6 and 7, these notches 24 and to-be-crimped portions 32 will be described further. Incidentally, FIGS. 2, 3, 5 and 6 are front views as viewed in the direction F in FIG. 1, and in FIG. 7, a front view is obtained when the clutch case and sleeve are viewed in the direction of arrow F.

As illustrated in FIG. 7, each notch 24 becomes gradually shallower toward the clutch case 3 as the distance from the free end surface (i.e., the top surface of the sleeve 20 as viewed in FIG. 7) becomes greater in the direction of arrow F in FIG. 7), so that a bottom wall 25 of the notch 24 is in a curved form.

Upon crimping, each to-be-crimped portion 32 of the inner circumferential wall of the clutch case 3 is pressed by a crimping tool in the direction of arrow F in FIG. 7 (in FIG. 6, in a direction perpendicular to the drawing sheet). As a result, a portion 33 of the inner circumferential wall of the clutch case 3 is forced out such that the forced-out portion 33 protrudes into the corresponding notch 24 to fixedly secure the sleeve 20 and the clutch case 3 with each other. A pressing surface of the crimping tool is formed such that, when the crimping tool is held in a position ready for initiating crimping, the pressing surface extends at an angle relative to the free end surface of the clutch case 3, specifically such that a front surface 34 of the resulting crimped portion is inclined to become deeper on a side of the clutch case 3 than on a side of the sleeve 20, in other words, the distance of the front surface 34 from a plane in which the free end surfaces of the sleeve 20 and clutch case 30 lie becomes greater toward the clutch case 3. The inclination of the front surface 34 of the crimped portion may adequately range from 5 to 15° (degrees) although it varies depending upon the material of the clutch case 3.

Crimping of the inner circumferential wall of the clutch case 3 against the sleeve 20 as described above makes it possible to fixedly secure the clutch case 3 and sleeve 20 with each other. The forced-out portions 33 are kept in engagement with the associated notches 24 and serve as rotation stoppers so that, even when a difference arises in expansion between the clutch case 3 and the sleeve 20 at an elevated temperature, the sleeve 20 does not slide relative to the clutch case 3. The oilway 21 and its corresponding oilway 35 are, therefore, kept in registration. Further, the forced-out portions 33 are fitted in the associated notches 24 without any clearance therebetween so that no rattling noise is produced.

In the above-described embodiment, the notches 24 are arranged at two locations in the outer circumference of the sleeve 20 with an angular interval of 180° therebetween. It is, however, to be noted that the sleeve is required to have at least one notch. When notches are arranged at plural locations, it is preferred to arrange them at equal intervals in the circumferential direction of the sleeve 20.

This application claims the priority of Japanese Patent Application 2001-251623 filed Aug. 22, 2001, which is incorporated herein by reference.

What is claimed is:

1. A multiplate clutch provided with a clutch case and a sleeve fitted in an inner circumferential wall of said clutch case with their piston oilways registered with each other, wherein:

said sleeve is provided in an outer circumference thereof with at least one notch; and said inner circumferential wall of said clutch case has been crimped at a portion thereof into said notch such that a crimped portion is formed to fixedly secure said sleeve on said inner circumferential wall of said clutch case, wherein said crimped portion is formed such that a front surface of said crimped portion is shallower on a side of said sleeve and deeper on a side of said clutch case.

2. A multiplate clutch according to claim 1, said front surface of said crimped portion has an inclination of from 5 to 15°.

3. A multiplate clutch according to claim 1, wherein said sleeve is provided with at least two notches with an interval therebetween in a circumferential direction of said sleeve.

* * * * *